W. N. MEARS.
ROTARY MOTOR.
APPLICATION FILED APR. 23, 1906. RENEWED APR. 13, 1912.

1,118,505.

Patented Nov. 24, 1914.
10 SHEETS—SHEET 1.

Witnesses:

Inventor:
William N. Mears,
by Walter E. Lombard,
Atty.

W. N. MEARS.
ROTARY MOTOR.
APPLICATION FILED APR. 23, 1906. RENEWED APR. 13, 1912.

1,118,505.

Patented Nov. 24, 1914.
10 SHEETS—SHEET 3.

Witnesses:
Edwin T Luce
Harry C Luce

Inventor:
William N. Mears,
by Walter E. Lombard,
Atty.

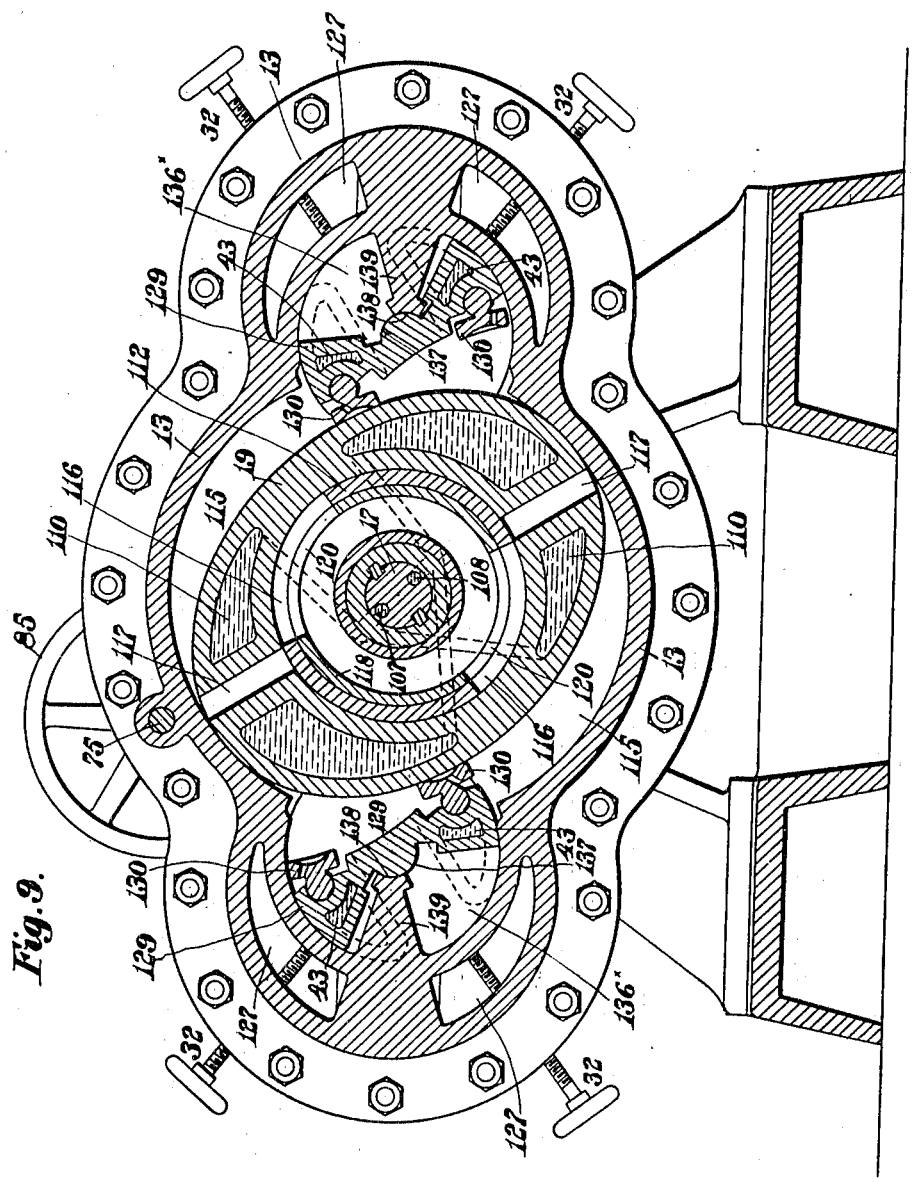

W. N. MEARS.
ROTARY MOTOR.
APPLICATION FILED APR. 23, 1906. RENEWED APR. 13, 1912.
1,118,505.
Patented Nov. 24, 1914.
10 SHEETS—SHEET 10.
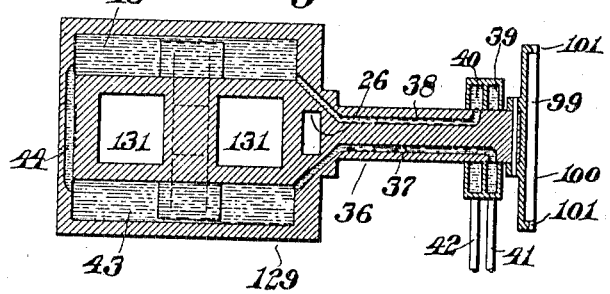
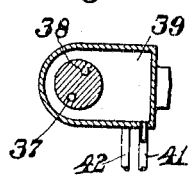
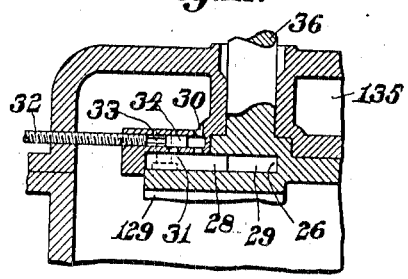
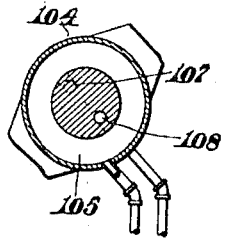
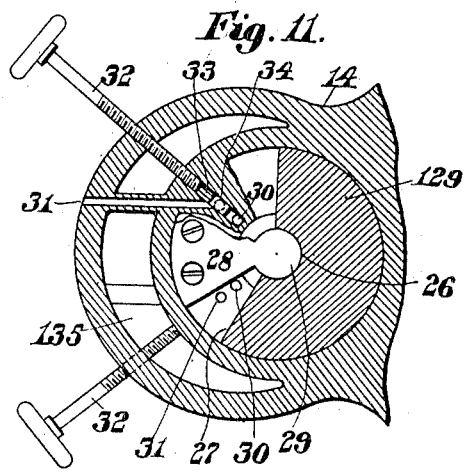
Witnesses:
Edwin T Luce
Harry O Luce
Inventor:
William N. Mears,
by Walter E Lombard,
Atty.

UNITED STATES PATENT OFFICE.

WILLIAM N. MEARS, OF BOSTON, MASSACHUSETTS, ASSIGNOR TO AMERICAN ROTARY MOTOR COMPANY, OF BOSTON, MASSACHUSETTS, A CORPORATION OF MAINE.

ROTARY MOTOR.

1,118,505. Specification of Letters Patent. Patented Nov. 24, 1914.

Application filed April 23, 1906, Serial No. 313,210. Renewed April 13, 1912. Serial No. 690,655.

*To all whom it may concern:*

Be it known that I, WILLIAM N. MEARS, a citizen of the United States of America, and a resident of Boston, in the county of Suffolk and State of Massachusetts, have invented certain new and useful Improvements in Rotary Motors, of which the following is a specification.

This invention relates to rotary pumps or engines and has for its object the production of an engine of this class which among other things is capable of developing the maximum power with the consumption of a minimum quantity of motive force, thereby increasing the economy of the engine over those of a similar type heretofore known.

Another object of the invention is to provide means for reducing the condensation so that the engine will be more effective in its operation. Provision is made for the balancing of the blades and the operation thereof so that the friction upon these elements is reduced to a minimum. Moreover, provision is made in this invention for securing a continuous movement of the motive force in the same direction while in order to make the engine more effective, means are provided for the exhaust of motive force through the operating blades.

My invention will be best understood from a description of an illustrative embodiment thereof shown in the accompanying drawings.

Figure 1:
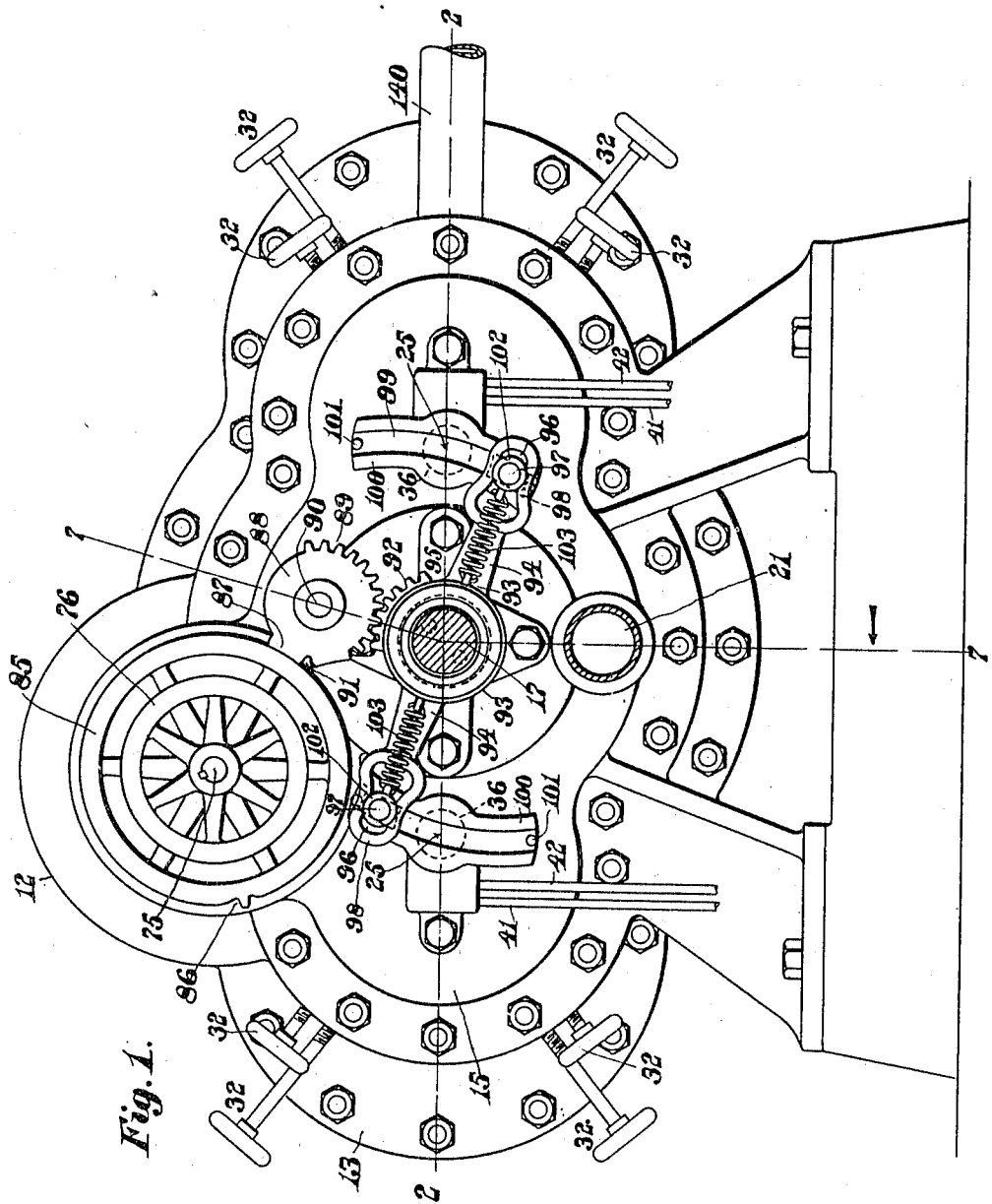
Figure 2:
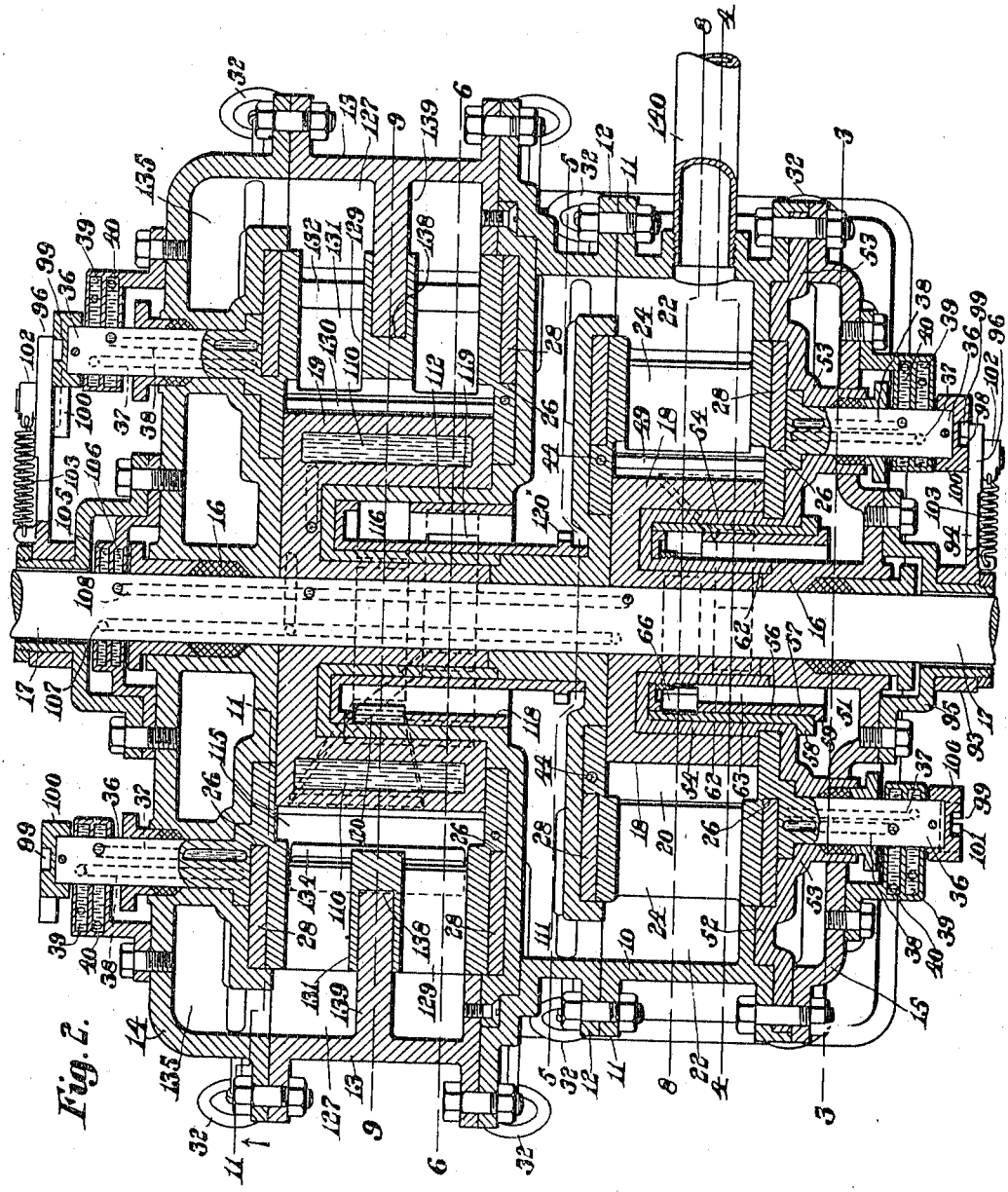
Figure 3:
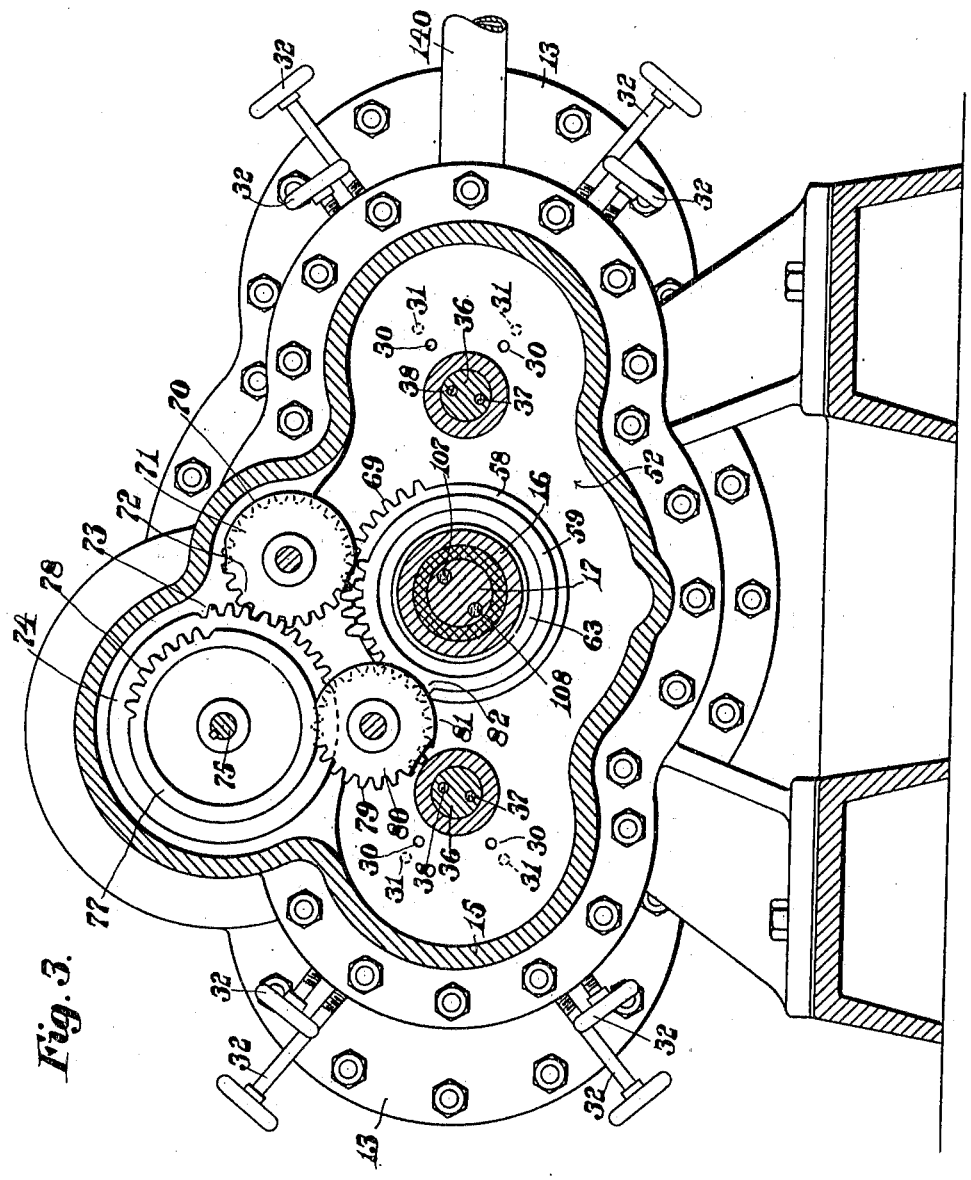
Figure 4:
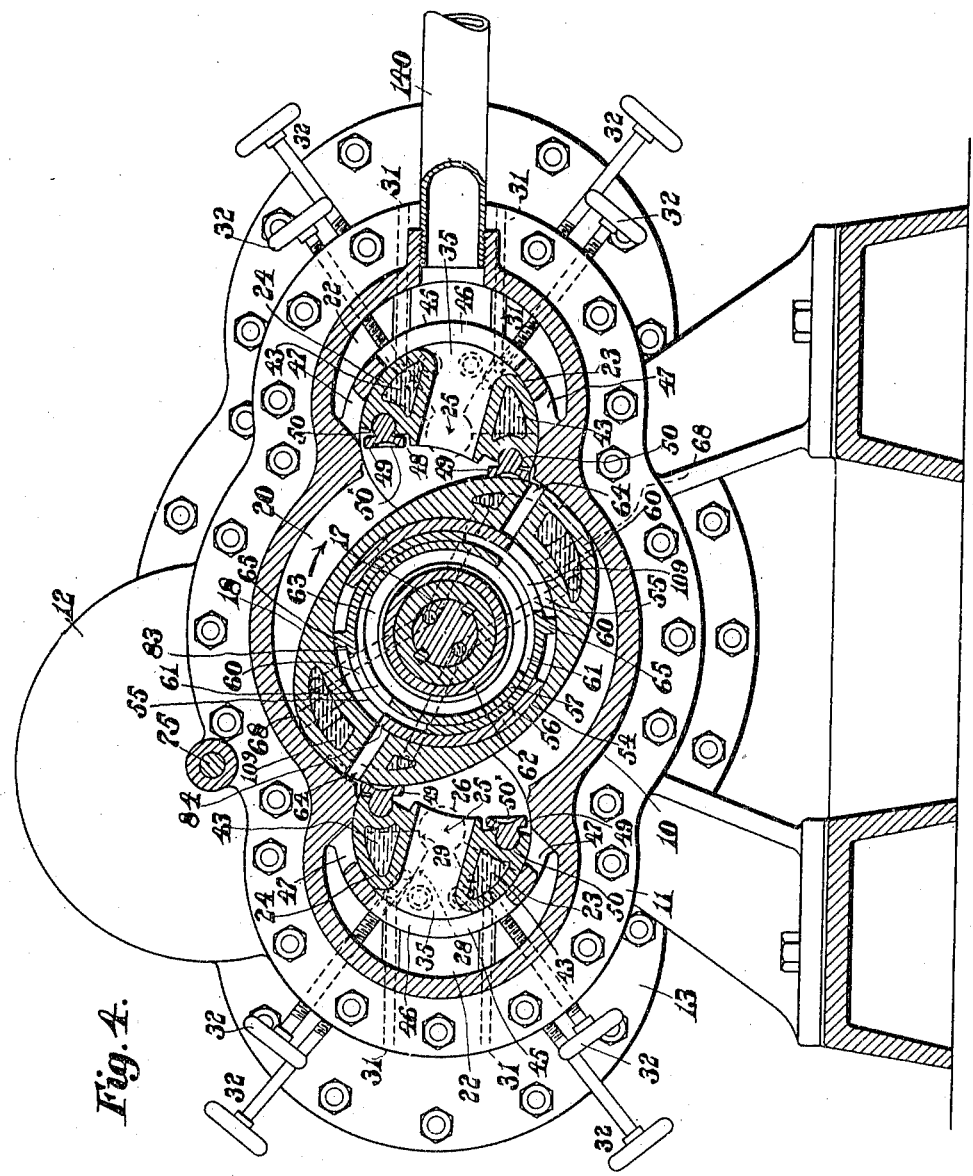
Figure 5:
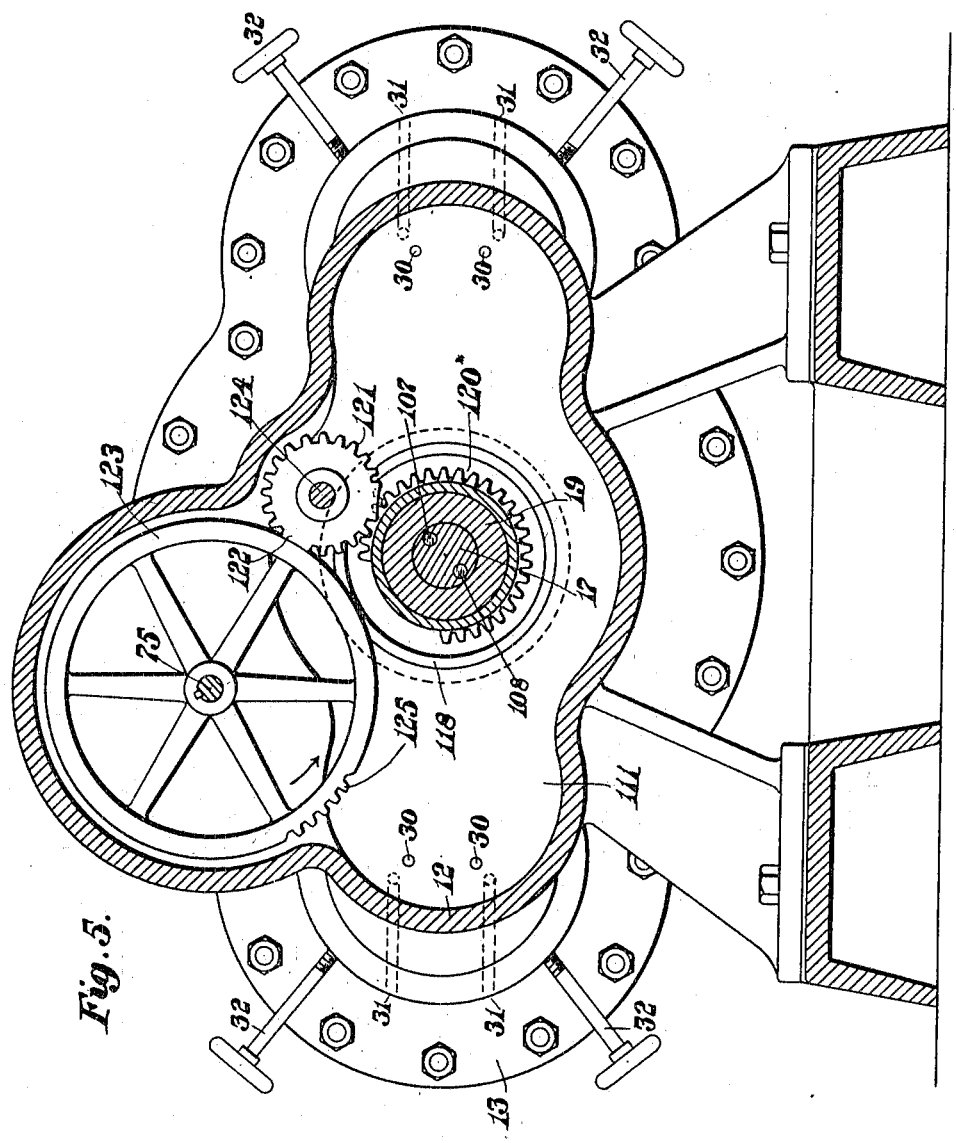
Figure 6:
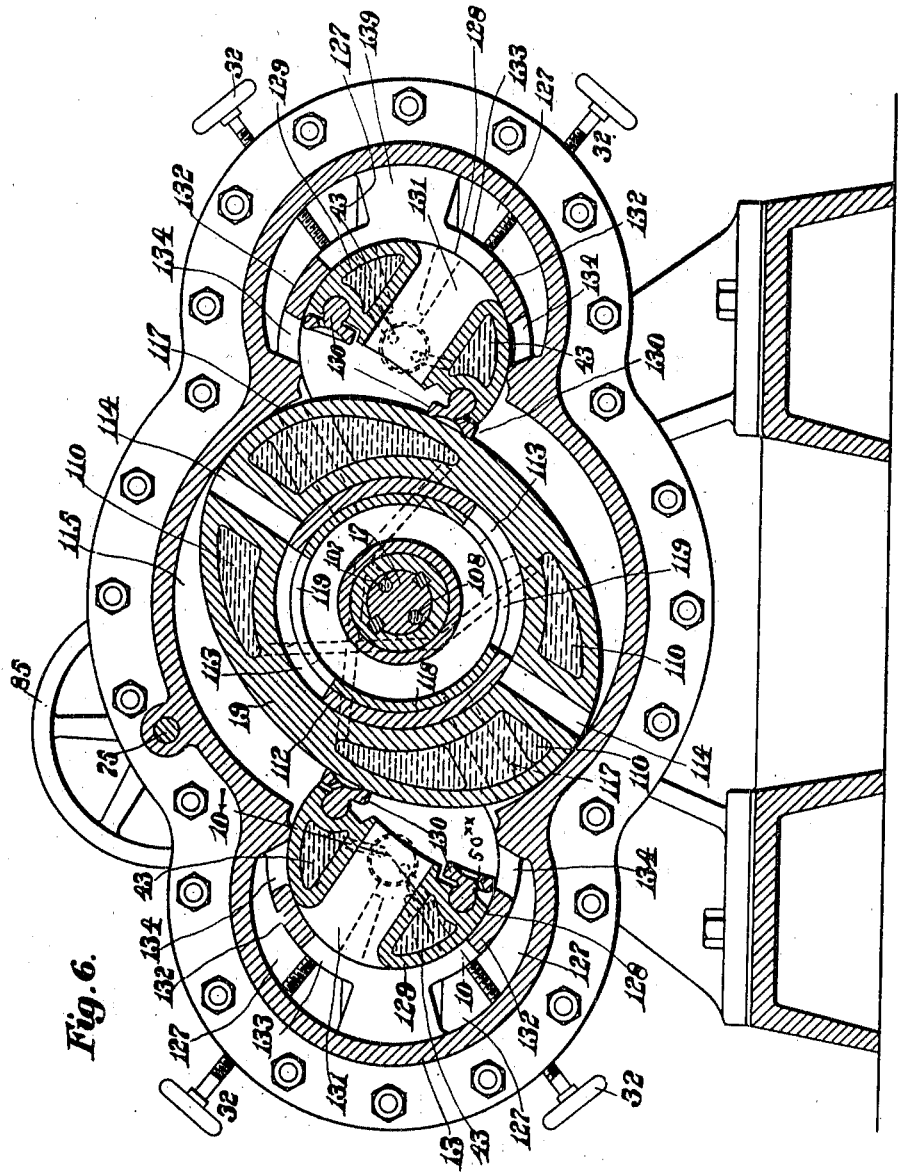
Figure 7:
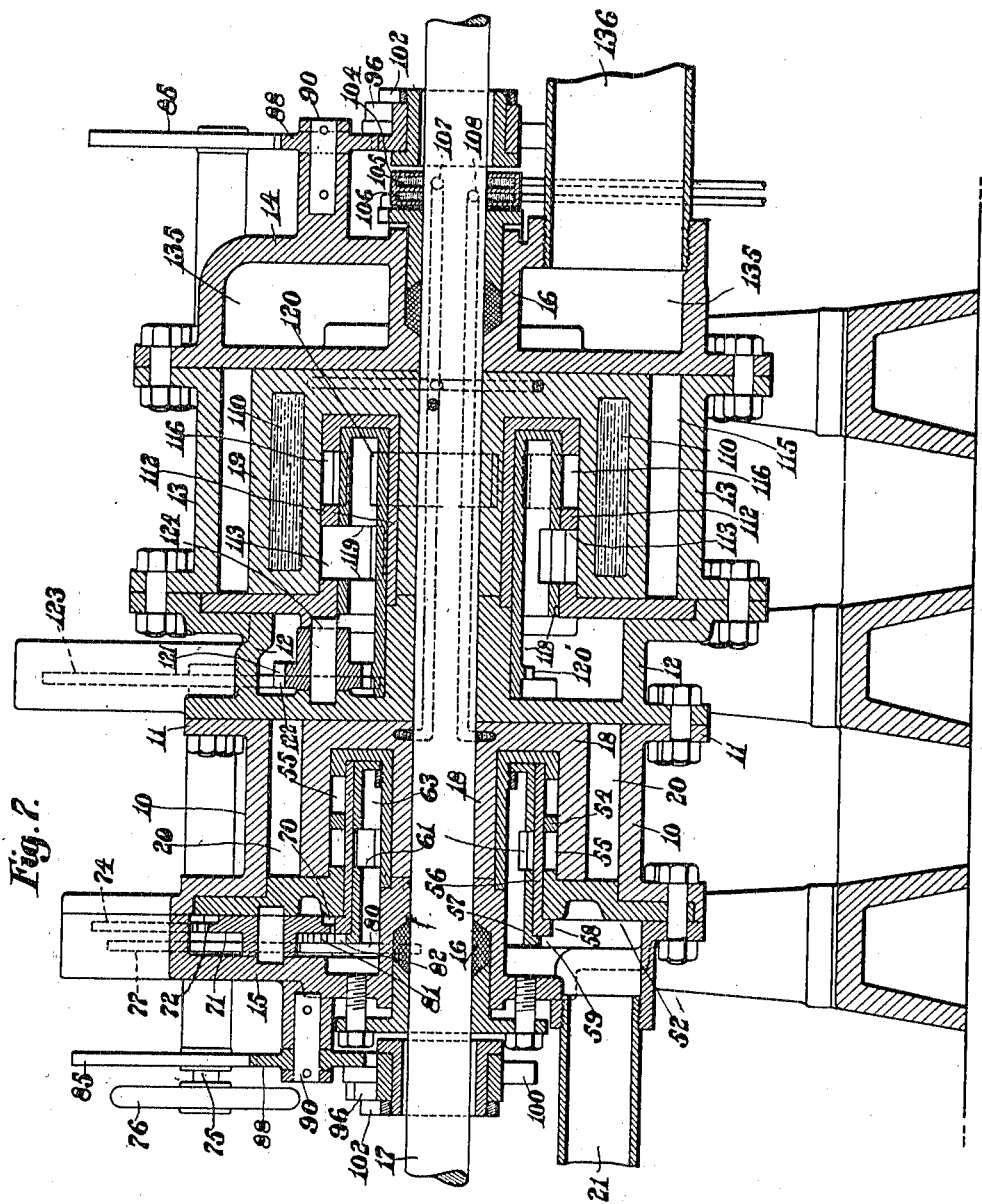
Figure 8:
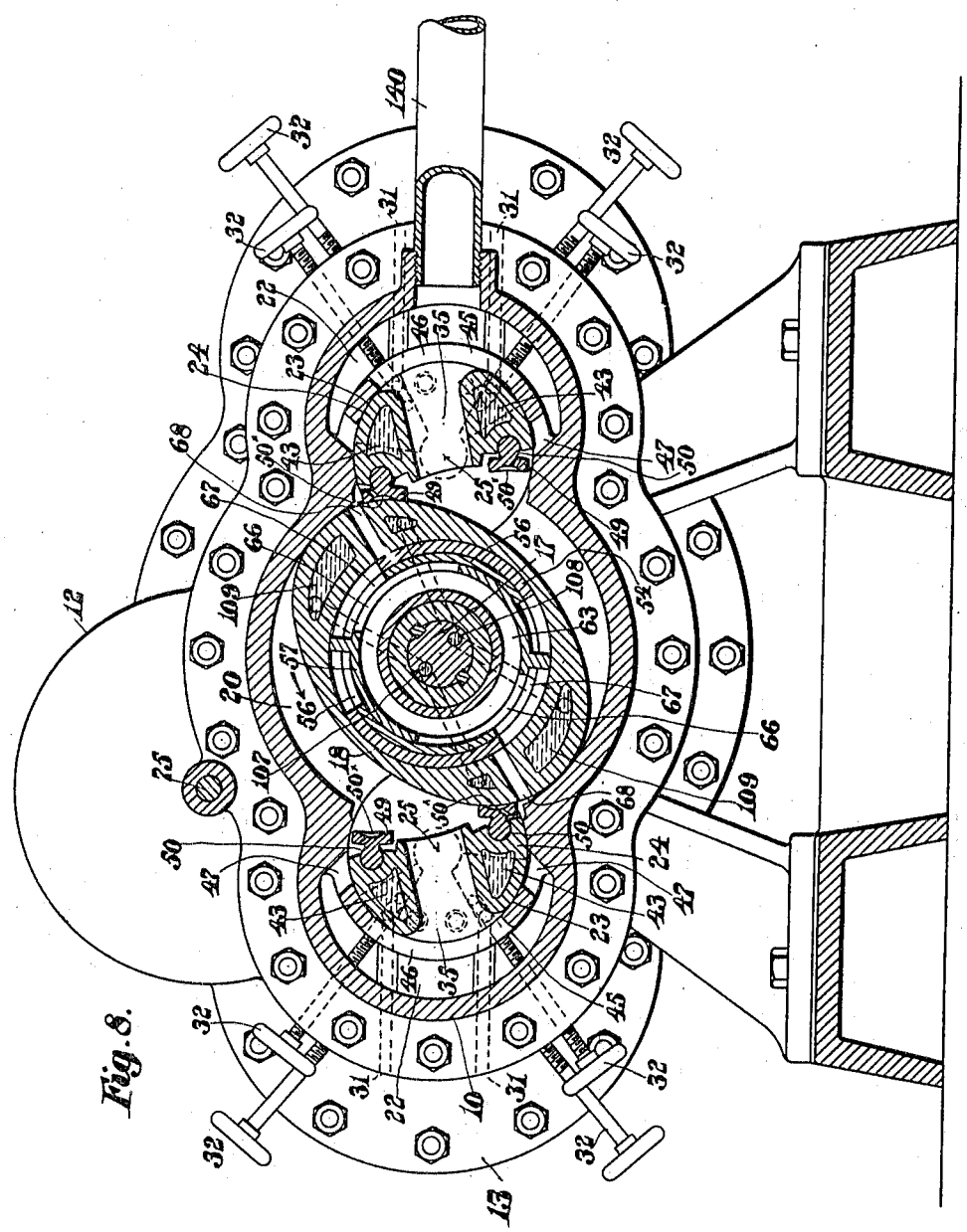

Of the drawings: Figure 1 represents an elevation of an engine embodying the features of this invention. Fig. 2 represents a horizontal section of the same on line 2—2 on Fig. 1. Fig. 3 represents a vertical section on line 3—3 on Fig. 2. Fig. 4 represents a vertical section on line 4—4 on Fig. 2. Fig. 5 represents a vertical section on line 5—5 on Fig. 2. Fig. 6 represents a vertical section on line 6—6 on Fig. 2. Fig. 7 represents a vertical transverse section on line 7—7 on Fig. 1, looking in the direction of the arrow. Fig. 8 represents a section similar to Fig. 4, the cutting plane being on line 8—8, Fig. 2, showing the pistons and blades in position for the engine to operate in the reverse direction. Fig. 9 represents a section similar to Fig. 6, the cutting plane being on line 9—9, Fig. 2, showing the pistons and blades in position for the engine to operate in the reverse direction. Fig. 10 represents a section of one of the pivoted blades, the cutting plane being on line 10—10 on Fig. 6, looking in the direction of the arrow. Fig. 11 represents a vertical section on line 11—11 on Fig. 2, showing the end support for the pivoted blades, said figure having a portion of the casing broken away to show the admission and exhaust ports and valves therefor for the passage of motive force to the chamber in rear of said blade. Figs. 12, 13 and 14 represent details of construction which will be hereinafter referred to in the specification.

Similar characters designate like parts throughout the several figures of the drawings.

In the drawings, 10 represents a casing to the rear flange 11 of which is bolted a frame 12 which in turn has bolted to its rear flange a larger casing 13. To the rear of the casing 13 is securely bolted a head 14 while to the front of the casing 10 is securely bolted a head 15, these heads 14—15 each being provided with a bearing 16 for a revoluble shaft 17 having keyed thereto within the casing 10, a piston 18, and within the casing 13, a piston 19.

The pistons 18 and 19 are at different angles to each other and revolve in unison with said shaft 17. The piston 18 is preferably elliptical in outline and revolves in a main chamber 20 within said casing 10, said chamber being concentric in outline. It is obvious, however, that the chamber 20 may be made elliptical or any other form, and the piston cylindrical or any other form, without affecting the operation of the invention as long as suitable provision is made for the admission of motive force between the piston and walls of the chamber 20.

So far as many features of my invention are concerned, it is of course apparent that I may employ a casing and a rotor of any suitable or desired type herein, said casing and rotor being relatively rotatable.

Motive force is admitted to the engine through the inlet 21, as shown in Figs. 1 and 7. The casing 10 is provided on either side of the chamber 20 with an extension provided with an exhaust chamber 22, said extensions being provided with a transverse recess 23 in each of which is mounted an abutment which is in this embodiment of the invention is typified as a blade 24 pivoted therein at 25. Either end of said blade is provided with a semi-cylindrical recess 26 and a segmental recess 27 in which is located a fixed segment 28, the inner end of which is provided with a disk-like portion 29 in line with the axis of said blades.

This disk portion 29 forms a suitable seat for the cylindrical recess 26 of said blade and the segmental portion 28 is of less width than the segmental recess 27 in the blade 24. This construction leaves an inclosed chamber between the end walls of the blades and the heads or frames in which said blades are mounted. An inlet 30 and an exhaust 31 therefor communicate with each of these chambers for the purpose of admitting motive force thereto to cause a movement of the blades about their axes and exhausting said motive force therefrom when its work has been performed and it is desired to move the blades in the opposite direction.

The admission of motive force through the passage 30 and the exhaust from said chamber through the outlet 31 are both controlled by means of a valve 32 provided with a reduced portion 33 which coincides with the exhaust passages 31 when the inlet 30 is closed by the inner end of said valve. When the valve 32 is moved outwardly to uncover the inlet 30, the inner end 34 of said valve is moved longitudinally to shut off the exhaust port 31, all as shown in Figs. 11 and 12.

Each blade 24 is provided with a passage or conduit 35 extending therethrough, said passage providing a communication from the main chamber 20 to the exhaust chamber 22, thereby permitting at proper times the motive force to exhaust from said chamber preferably the passage or conduit 35 is substantially tangential to the rotor casing or cylinder when in position to exhaust into said exhaust chamber. Each of the blades 24 is provided with an outwardly extending axial trunnion 36 provided with parallel passages 37—38 the outer ends of which communicate respectively with the chambers 39—40. These chambers 39—40 are provided respectively with an inlet pipe 41 and an exhaust pipe 42. The opposite ends of the passages 37—38 communicate with chambers 43 extending longitudinally of said blades and connected at their opposite ends by means of a passage 44. A suitable temperature regulating agents such as water, air, or live steam, is permitted to pass from the inlet pipe 41 through these passages and exhaust through the pipe 42, thereby maintaining the blades at any desired temperature.

The wall 45 between the exhaust chamber 22 and the recess 23 is provided with an opening 46 coöperating with the passage 35 through the blades 24 and also with the ports 47 at either end of said chambers whereby the motive force may be exhausted around said blade 24 as well as through the passage 35. By this construction the motive force bears upon each of said blades at various points about its periphery, thereby substantially balancing the same and making it more effective in its operation, reducing as it does the amount of friction thereon.

The inner face of each of said blades is depressed somewhat from the inner face of the chamber 20 and is provided on either side of the passage 35 with a depression 48 in which is mounted a bearing plate or device 49, the rear of which is provided with a cylindrical projection 50 extending longitudinally of said plate or member. This cylindrical projection is mounted in a suitable recess extending longitudinally of said blade 24 so that the member 49 is adapted to rock in its bearing so that its working face will coöperate with the exterior face of the piston 18 and prevent motive force from passing between the same. The inlet 21 admits motive force to a compartment 51 in the head 15. The working face of the rocker 49 is provided with a recess or chamber 50* which is adapted to contain sufficient motive force or fluid to partially counteract the effect of the motive force upon the face or faces of said rocker member 49.

The fluid admitted to each chamber or recess 50× is intended partially to counteract the force by which each abutment is held against the rotor. As a means for introducing the fluid to such recess or chamber 50× an opening 50×× through the shoe either from the rear or front is provided; that is, an opening is provided either from the inlet or exhaust chambers. In Fig. 6, I have illustrated the said passage 50×× in the shoe 130 leading from the front to the said pocket 50×. In the use of steam or in the use of a pump, the fluid thus introduced would act as a packing as well as a counterpressure.

Interposed between the casing 10 and the head 15 is a plate 52 securely bolted to said casing and head and provided at 53 with a suitable extension forming a bearing for the trunnion 36 of the blade 24 and with a cup-shaped extension 54 on the opposite side thereof extending into a cylindrical recess in the piston 18. The extension 54 is provided with diametral ports 55 and has fitted thereto the concentric valves 56 and 57, the front ends of which are provided, respectively, with flanges 58 and 59. The valve 56 is provided with diametral ports 60 while the valve 57 is likewise provided with diametral ports 61.

Between the inner wall 62 of said cup-shaped extension 54 and the valve 57 is an annular passage 63 communicating with the compartment 51, thereby permitting motive force to pass from said compartment 51 through the ports 61—60—55 and through the diametral passages 64 in the piston 18 to the chamber 20 when said passages 64 are opposite the ports 55.

In the construction shown in the drawings the cup-shaped extension 54 is fixed in relation to the casing 10 and the piston 18 is adapted to revolve freely in the direction indicated by the arrow on Fig. 4.

In Fig. 4 the piston 18 is shown in position with the passage 64 thereof as about to uncover the port 55 to permit the motive force to pass from the compartment 51 through the passage 63 of said extension 54, and through the ports in the valves 56—57 into the passage 64, from which it enters the chamber 20. The action of the motive force thus entering the chamber 20 will co-act with the rocking member 49 of the blade 24 to continue to drive the piston in the direction indicated by the arrow on said figure. Steam will continue to be admitted through the passage 64 until said passage passes the shoulder 65 on the valve 56, when the piston by its own movement will cut off further admission of motive force to the compartment 20.

It is obvious that a movement of the valve 56 about the axis of the shaft 17 will vary the amount of admission of the motive force to the compartment 20 and the duration thereof. The valve 57 is provided with another set of ports 66 in a different plane or offset from the ports 61 which co-act with the coöperating ports 67 to permit the motive force to pass from the passage 63 to the passages 68 (in lieu of the passages 64) in the piston 18, to admit said motive force to the chamber when it is desired to operate the engine in the reverse direction.

This movement of the valves 56—57 is controlled by suitable manually operated mechanism which will cause the valves to operate in unison when it is desired to change the direction of movement of the engine but which will permit the valve in operation to be moved independently of the other valve when it is desired to control the amount of admission of motive force to the chamber 20.

The operation of the valves 56—57 is controlled as follows: The flange 58 of the valve 56 is provided with a segment of a gear 69 the teeth of which engage the teeth 70 formed in one plane around a portion of the periphery of an intermediate revoluble member 71 which is also provided in a different plane about another portion of its periphery with a plurality of teeth 72 which engage the teeth 73 formed around a portion of the periphery of the disk 74 keyed to a revoluble shaft 75 and adapted to be rotated manually by means of the handle 76 keyed to the outer end of said shaft. Upon the same shaft 75 is secured a disk 77 a portion of the periphery of which is provided with a plurality of teeth 78 which are adapted to engage the teeth 79 formed about a portion of an intermediate revoluble disk 80 which in turn has in a different plane a plurality of teeth 81 about a portion of its periphery, said teeth being adapted to engage with the teeth 82 formed about a portion of the periphery of the flange 59 of the reversing valve 57.

As shown in Fig. 3, the teeth 73—72 are in engagement and the teeth 70—69 are in engagement and it is obvious that by any rotation of the handle 76 the valve 56 may be moved about its axis in either direction to increase or decrease the amount of opening in the ports 60, thereby regulating the admission of motive force to the chamber 20. This movement of the valve is accomplished without in any way effecting the movement of the reversing valve. If the handle 76 is operated sufficiently to entirely close the port 60 so that the projection 83 overlaps the shoulder 84 on said tubular extension 54 the gear teeth 78 will be moved about the axis of the shaft 75 to engage the teeth 79 so that the intermediate member 80 will operate through its teeth 81 meshing with the teeth 82 on the reversing valve to cause a movement of said valves about the axis of the shaft 17 to cause its ports to coöperate with the passages 68 to permit the motive force in the compartment 51 to pass through the piston and said ports into said chamber 20 to cause the engine to move in a reverse direction.

At the front of the machine the shaft 75 has secured thereon, intermediate the hand wheel 76 and the head 15, a wheel 85 provided upon its periphery with a single tooth 86. The periphery of the wheel 85 co-acts with one of a pair of concaved projections 87 projecting from a disk member 88 provided upon a portion of its periphery with a series of gear teeth 89. The projections 87 are so constructed that the disk member 88 is locked and prevented from turning on its axis 90 while the wheel 85 is free to turn upon its axis to operate the valve members as heretofore described.

It is obvious, however, that as soon as the wheel 85 has moved about its axis sufficiently to permit the tooth 88 to engage the notch 91 between said concaved projections 87, a further continuation of the movement of said wheel 85 will cause the disk 88 to be moved about its axis and as the teeth 89 thereon engage with teeth 92 upon a member 93, provided with radial arms 94 and mounted upon a support 95 secured to the front of the machine, said member 93 will be moved about said support until said tooth 86 has disengaged itself from the notch 91 when the concaved portion of the other projection 87 will at this time have engaged the periphery of the wheel 85 to lock the disk member 88 from further movement in this direction.

The arms 94 are provided at their outer ends with cam slots 96 which engage with studs 97 secured to and projecting from slides 98 movable in the curved groove 99 formed in a member 100 secured to the outer end of the trunnion projection 36 of the pivoted blade 24. Stops 101 are provided at either end of said groove 99 to limit the movement of the slides 98 in either direction. The groove 99 is so curved and so arranged relative to the trunnion 36 of the blade 24 that a movement of the slide 98 from its position shown in Fig. 1 to the other extreme of its movement at the opposite end of said groove 99 will cause the blade 24 to be moved about its axis into a position to permit the reversal of the engine.

Surrounding the stud 97 is a member 102 having attached thereto a spring 103, the opposite end of which is fixed to the member 93, the tension of said spring being to draw the member 102 and stud 97 co-acting therewith toward the axis of the shaft 17, therewith toward the axis of the shaft 17, thereby causing the rocking member 49 on the pivoted blade 24 to bear against the face of the piston with which it is co-acting.

The slot 96 is shaped in the manner shown in Fig. 1 so that as the stud 97 moves toward the axis of said shaft 17 it may move in a path concentric with the axis of the trunnion 36 of the blade 24. To the rear end of the head 14 is secured a member 104 surrounding the shaft 17, said member being provided with two chambers 105—106 which communicate with the parallel passages 107—108 extending lengthwise of said shaft 17 and communicating with the chambers 109—110 located respectively in the rotor which in this type of the invention consists of the pistons 18—19. The chambers 105—106 are provided respectively with a suitable inlet and outlet for a suitable temperature-regulating agent which is adapted to pass through said chambers and passages into the interiors of the pistons to regulate the temperature of said piston for the purpose of preventing condensation.

The temperature regulating agent, which may be any suitable fluid, liquid, semi-liquid or the like, may be introduced from any suitable source not herein shown, so as to be pumped, or otherwise forced or fed in a stream of any desired strength, which stream may, of course, be more or less intermittent or continuous, according to the means employed for circulating the agent. Such means, not being particularly herein claimed, it is unnecessary to disclose or to describe in this application, it being clearly understood that the agent may be introduced in any desired manner from any desired source.

The chamber 22 communicates with a passage 111 in the intermediate member 12, which member is provided with a cup-shaped projection 112, which extends into a recess in the center of the piston 19, the outer wall of said projection 112 being provided with suitable ports 113 communicating during the rotations of said piston with the passages 114 extending through said piston to permit motive force passing therethrough into the chamber 115 within the casing 13 in which said piston 19 is adapted to revolve. In a different plane from the ports 113, said projection 112 is provided with other ports 116 adapted to communicate with the ports 117 during the rotation of said piston to permit the motive force passing therethrough into the chamber 115 when it is desired that the engine should be moved in the reverse direction. Fitted to the interior of said projection 112 is a valve 118 provided with ports 119 in one plane coöperating with the ports 113 and with ports 120 coöperating with the ports 116 in a different plane. The valve 118 is so constructed as to permit motive force from the passage 111 to enter but one of the passages or ports 114 and 117 at the same time and is also constructed so as to shut off the passage of motive force at times to either of said passages or ports.

This movement of the valve 118 is controlled through the gear teeth 120* upon the hub of said valve 118, said teeth engaging with a toothed disk 121 provided at 122 with a concaved member fitting the periphery of the wheel 123 mounted upon and revoluble with the shaft 75. The wheel 123 is adapted to be revolved with said shaft to a certain extent without operating upon the member 121, which during this movement is locked from turning about its axis 124. Said wheel 123 is provided, however, with a plurality of teeth 125 which are adapted to engage the teeth of the member 121 to move it about its axis 124 to rotate said valve 118 to cause the ports 119 therein to communicate with the ports 113 in the projection 112 to permit motive force to pass from the passage 111 through the passages 114 into the chamber 115.

This movement of the valve 118 about its axis is continued until the ports 113—119 are fully opened at which time the ports 116—120 in a different plane in said valve 118 will be completely closed. A movement of the teeth 125 in the opposite direction will operate upon the disk member 121 to close the ports 113—119 and open the ports 116—120 when it is desired to reverse the movement of the engine. It must be understood that during the operation of the engine in either direction, one of the two sets of ports 113—119 and 116—120 is fully opened when the other is fully closed and the only time that both sets are partially opened at the same time is when the blades 129 are being moved about their axes to secure a reversal of movement.

The casing 13 is provided with exhaust compartments 127 between which and the chamber 115, said casing is provided with a concaved recess 128 in which is mounted a rotatable blade 129 provided at either end of its working face with rocking members 130 and having a passage 131 extending therethrough through which the exhaust from the chamber 115 may pass into the chamber 127. The wall 132 between the chamber 127 and the recess 128 is provided with a port 133 which coöperates with the passage 131 and is also provided with passages 134 at either end of said chamber which permits the motive force acting upon the blade to balance the same and which also operates when uncovered to permit the exhaust from the chamber 115 into the chamber 127 around said valve in a similar manner to the blades 24 in the casing 10. As will be seen from the drawings, the casing 13, the chamber 115 and the piston 19 operating therein are larger than the casing 10, chamber 20 and piston 18 operating therein. This permits the exhaust from the chamber 20 in its expanded form to operate upon the piston in such a manner that it will work in unison with the piston 18 operated upon before the motive force has been expanded. The exhaust from the chamber 127 passes into the compartment 135 in the head 14 from which it is finally exhausted through the passage 136.

The blades 129 are operated to move them about their axes by means of devices exactly duplicate to the devices for controlling the movement of the blades 24 and these blades are provided with similar passages to those shown in 24 for the circulation of a suitable temperature-regulating agent.

Each of the blades 129 is provided with a chamber 136*, the inner end of which is provided with a semi-cylindrical portion 137 extending longitudinally of the blade, said semi-cylindrical portion fitting a concaved seat 138 formed upon the end of a fixed support 139, extending into said chamber 136 from end to end thereof. This construction provides a solid support for the blades 129 preventing them from buckling when considerable strain is brought to bear thereon.

A pipe 140 passes through the casing 10 into the interior thereof affording a ready means of supplying motive power therethrough to start the engine when the valves of the piston 18 are closed, said motive power passing through the passages 111 and the piston 19 into the chamber 115 where it acts upon this piston to turn the shaft 17 about its axis and permit motive force to pass into the chamber 20 through its piston 18 in the manner heretofore described.

The valve and blade operating mechanisms are so timed that when the engine is running with the valves open and it is desired to stop the engine, the admission valves of the front piston will first be closed and then by a continuation of the movement, the valves of the rear piston will be closed. During the closing of the valves of the rear piston the position of the blades in both casings will be reversed so that the engine may be run in the reverse direction. After this reversal of the position of the blades a continuation of movement opens the reverse ports in the valves in the first piston, after which the engine will continue to run in reverse direction until the operating wheel is moved in the opposite direction.

Any number of casings 10 and 13 may be used, each succeeding casing being of larger dimensions than the preceding one to take care of the expansion of motive force passing into the compartment within said casing and the pistons working in these various compartments are located about the shaft 17 at various angles thereon so that motive force is always being admitted to act upon one end of the pistons so that dead centering is wholly overcome. By providing communicating passages through the various blades and through the pistons whereby a temperature-regulating agent may circulate therethrough the condensation of motive force is entirely obviated.

The supply of the temperature-regulating agent may be changed at any desired time to make the agent of lower temperature in order to cool the various working parts of the engine. It is obvious that while the casing is shown as fixed and the piston is shown as revoluble therein, a reversal of these movements is possible without changing the scope of this invention and furthermore while the rotatable blades are shown located within the casing and co-acting with the periphery of the piston, these blades might be located within the piston and have their working faces coöperate with the inner walls of the chambers in which said piston operates without changing the scope of this invention.

If the engine herein disclosed be operated as a rotary gas engine it may be employed to drive a vehicle, whether it be an aerial, land or marine vehicle.

The valve-operating mechanism is so constructed that in the normal position the various valves and blades are locked and prevented from operating and the valves are closed to prevent the admission of any motive force to the engine.

For purposes of illustration, I have here shown and described a rotary engine particularly designed for steam. It is obvious, however, that my invention is not restricted to the particular embodiment here shown for illustrative purposes, nor is my invention restricted to the use of steam as a motive force, for obviously the various features of my invention are equally adapted, with at the most slight mechanical changes, to the use of any motive force, such for instance as gas.

It is believed that the description of the drawings is sufficiently clear to fully disclose the operation of the invention without further description thereof.

Claims:

1. A rotary engine comprising a casing member, a piston member therein, means permitting the rotation of one of said members, a blade pivoted to one of said members and co-acting with the other member, a chamber within said piston communicating by a passage through said piston with the interior of said casing, means for admitting motive force to said chamber, and means located within said piston chamber for regulating the admission of the motive force to said communicating passage and for reversing the engine.

2. A rotary engine comprising a casing member, a piston member therein, means permitting the rotation of one of said members, a blade pivoted to said casing member and co-acting with the piston member, a chamber within said piston communicating by a passage through said piston with the interior of said casing, means for admitting motive force to said chamber, and means located within said piston chamber for regulating the admission of the motive force to said communicating passage and for reversing the engine.

3. A rotary engine comprising a casing member, a piston member therein, means permitting the rotation of said piston member, a blade pivoted to one of said members co-acting with the other member, a chamber within said piston communicating by a passage through said piston with the interior of said casing, means for admitting motive force to said chamber, and means located within said piston chamber for regulating the admission of the motive force to said communicating passage and for reversing the engine.

4. A rotary engine comprising a casing member, a piston member therein, means permitting the rotation of said piston member, a blade pivoted to one of said members and co-acting with the other member, a chamber within said piston communicating with the interior of said casing, means for admitting motive force to said chamber, a stationary cylindrical hub fitting the interior bore of said piston and provided with two sets of ports in different planes, and a manually operated cylindrical valve within said hub and provided with two sets of ports in the same planes as those in said cylindrical hub, each set being adapted to operate independently of the other set.

5. A rotary engine comprising a casing member, a piston member therein, means permitting the rotation of one of said members, a blade pivoted to said casing member and co-acting with the piston member, a chamber within said piston communicating with the interior of said casing, means for admitting motive force to said chamber, and a cylindrical valve member contained within said piston chamber provided with ports for varying the passage of motive force from said piston chamber to the interior of said casing.

6. A rotary engine comprising a casing member, a piston member therein, means permitting the rotation of one of said members, a blade pivoted to one of said members and co-acting with the other member, a chamber within said piston communicating with the interior of said casing, means for admitting motive force to said chamber, and a cylindrical valve member contained within said piston chamber provided with ports for varying the passage of motive force from said piston chamber to the interior of said casing, and for reversing the engine.

7. A rotary engine comprising a casing, a piston therein, means permitting the rotation of said piston, a blade pivoted to said casing co-acting with said piston, a chamber within said piston communicating with the interior of said casing, and a cylindrical valve within said piston for admitting motive force to said chamber through ports formed in said chamber.

8. A rotary engine comprising a casing, a piston therein, means permitting the rotation of said piston, a blade pivoted to said casing co-acting with said piston, a chamber within said piston communicating with the interior of said casing, a cylindrical valve provided with ports for admitting motive force to said chamber, and means contained within said piston chamber and manually operated for varying the passage of motive force from said piston chamber to the interior of said casing.

9. A rotary engine comprising a casing, a piston therein, means permitting the rotation of said piston, a blade pivoted to said casing co-acting with said piston, a chamber within said piston communicating with the interior of said casing, means for admitting motive force to said chamber, a stationary cylindrical hub fitting the interior bore of said piston and provided with two sets of ports, and a manually operated valve within said hub provided with two sets of ports in the same plane as those in said cylindrical hub and adapted to operate independently of each other.

10. A rotary engine comprising a casing member having a main chamber, a piston member therein, means permitting the rotation of one of said members, an exterior chamber in said casing, a blade pivoted to one of said members separated from one of said chambers by a partition and provided with a passage therethrough communicating with the main chamber and the exterior chamber, means for admitting motive force to one of the chambers, and means for exhausting from the other chamber.

11. A rotary engine comprising a casing member having a main chamber, a piston member therein, means permitting the rotation of one of said members, an exterior chamber in said casing, a blade pivoted to said casing separated from said exterior chamber by a partition and provided with a passage therethrough communicating with the main chamber and the exterior chamber, and means for exhausting from the exterior chamber.

12. A rotary engine comprising a casing member having a main chamber, a piston member therein, means permitting the rotation of one of said members separated from one of said chambers by a partition, an exterior chamber in said casing, and a blade pivoted to one of said members and provided with a passage therethrough communicating with the main chamber and the exterior chamber.

13. A rotary engine comprising a casing member having a main chamber, a piston member therein, means permitting the rotation of one of said members, an exterior chamber in said casing, a blade pivoted to said casing separated from the exterior chamber by a partition and provided with a passage therethrough communicating with the main chamber and the exterior chamber for the passage of motive force from said main chamber to said exterior chamber, means for regulating the admission to said main chamber, and means for exhausting from the exterior chamber.

14. A rotary engine comprising a casing member having a main chamber, a piston member therein, means permitting the rotation of one of said members, an exterior chamber in said casing, a blade mounted in said casing and having a to and fro movement therein and provided with a passage therethrough communicating with the main chamber and the exterior chamber, and means for passing a temperature-regulating agent through said blade.

15. A rotary engine comprising a casing member having a main chamber, a piston member therein, means permitting the rotation of one of said members, pivoted blades in one of said members and co-acting with the other member and having provisions permitting the exhaust through said blades, and connectors transmitting any movement of one of said blades to the other.

16. A rotary engine comprising a casing member having a main chamber, a piston member in said main chamber, means permitting the rotation of one member, means for supplying motive force to said chamber through its piston, two independently operated cylindrical valves within said piston, and means for controlling the passage of motive force to said chamber.

17. A rotary engine comprising a casing member having a main chamber, a piston member in said main chamber, means for supplying motive force to the first chamber through its piston, a cylindrical hub on which said piston is directly mounted provided with ports, and two valves located within said hub for controlling the supply of motive force, and reversing the engine.

18. A rotary engine comprising a casing, a rotatable piston therein, blades coöperating therewith, and manually operated mechanism surrounding the shaft of said piston and directly connected to said blades whereby said blades may be reversed in unison.

19. In a rotary engine, the combination with a casing, of a piston therein, a rotatable shaft for said piston, a radial member movable about the axis thereof, mechanism co-acting therewith to produce an oscillating movement, pivoted blades coöperating with said piston, and connecting mechanism between said blades and radial member whereby the movement of said blades is positively controlled.

20. In a rotary engine, the combination with a casing, of a piston therein, a rotatable shaft for said piston, a radial member movable about the axis thereof, mechanism including a locking mechanism co-acting therewith to produce an oscillating movement, pivoted blades coöperating with said piston, and connecting mechanism between said blades and radial member whereby the movement of said blades is positively controlled.

21. In a rotary engine, the combination with a casing, of a rotatable piston therein, a stationary hub in alinement with the axis of said piston, a radial member mounted upon said hub, means for moving said member about said hub and locking it, and a pivoted blade operated by said radial member co-acting with said piston.

22. In a rotary engine, the combination with a casing member and a piston member one of said members being rotatable, of a blade pivoted in a recess in one of said members with its working face depressed from the face of said member, and a rocking device secured to said blade and extending beyond the face of said member and adapted to co-act with the face of the other member.

23. In a rotary engine, the combination with a casing member and a piston member one of said members being rotatable, of a blade pivoted in a recess in one of said members with its face depressed from the face of said member, a rocking device secured to said blade adapted to co-act with the face of the other member, and yielding means for retaining said rocking device in said contact.

24. In a rotary engine, the combination with a casing member and a piston member, one of said members being rotatable, of a blade located in a recess in one of said members provided with a segmental recess at either end terminating in a semi-cylindrical portion at the axis of the blade, and a fixed disk member fitting said semi-cylindrical portion and forming a support upon which said blade is adapted to move.

25. In a rotary engine, the combination with a casing member and a piston member, one of said members being rotatable, of a blade located in a recess in one of said members provided with a segmental recess at either end terminating in a semi-cylindrical portion at the axis of the blade, and a fixed disk member fitting said semi-cylindrical portion and forming a support upon which said blade is adapted to move, said disk member being provided with a segmental support of less width than the segmental recess in which it is located serving to limit the movement of said blade about its axis.

26. In a rotary engine, the combination with a casing member and a piston member, one of said members being rotatable, of a blade located in a recess in one of said members provided with a segmental recess at either end terminating in a semi-cylindrical portion at the axis of the blade, a fixed disk member fitting said semi-cylindrical portion and forming a support upon which said blade is adapted to move, said disk member being provided with a segmental support of less width than the segmental recess in which it is located serving to limit the movement of said blade about its axis, and means for supplying motive force to said segmental recess to move said blade about its axis.

27. In a rotary engine, the combination with a casing member and a piston member, one of said members being rotatable, of a blade pivoted in a recess in one of said members, an axial trunnion to said blade, an arm secured to said trunnion, and means slidable upon said arm for reversing said blade.

28. In a rotary engine, the combination with a casing member and a piston member, one of said members being rotatable, of a blade pivoted in a recess in one of said members, an axial trunnion to said blade, a grooved radial member secured to said trunnion, a slide in said groove provided with a projection thereon, and an arm engaging said projection adapted to move it lengthwise of said grooved member to reverse the blade.

29. In a rotary engine, the combination with a casing member and a piston member, one of said members being rotatable, of a blade pivoted in a recess in one of said members, an axial trunnion to said blade, a grooved radial member secured to said trunnion, a slide in said groove provided with a projection thereon, and an arm provided with a cam-shaped slot engaging said projection and adapted to move it on said grooved member to reverse the blade.

30. In a rotary engine, the combination with a casing member and a piston member, one of said members being rotatable, of a blade pivoted in a recess in one of the members, a valve regulating the admission of motive force to said casing member, and mechanism adapted to reverse the action thereof including devices to lock simultaneously the valves and blade in reversed position.

31. In a rotary engine, the combination with a casing member, and a piston member, one of said members being rotatable, of two valves in axial alinement regulating the admission of motive force to the engine, one of which is adapted to operate at a time, and mechanism adapted to shut off one valve before opening the other.

32. In a rotary engine, the combination with a casing member, and a piston member, one of said members being rotatable, of two valves in axial alinement regulating the admission of motive force to the engine, one of which is adapted to operate at a time, and mechanism adapted to shut off one valve before opening the other, said mechanism including devices for locking the valves in adjusted position.

33. In a rotary engine, the combination with a casing member, and a piston member, one of said members being rotatable, of two valves regulating the admission of motive force to the engine, one of which is adapted to operate at a time, a blade pivoted to one of said members, and mechanism for reversing the positions of said blade and shutting off one valve before opening the other, said mechanism including devices for locking the valves in adjusted position.

34. In a rotary engine, the combination with a casing member, and a piston member, one of said members being rotatable, of two valves regulating the admission of motive force to the engine, one of which is adapted to operate at a time, a blade pivoted to one of said members, and mechanism for reversing the positions of said blade and shutting off one valve before opening the other, said mechanism including devices for locking the valves and blade in their adjusted positions.

35. In a rotary engine, the combination with a casing member and a piston member, one of said members being rotatable, of a blade located in a recess in one of said members provided with a semi-cylindrical portion intermediate its ends, and a fixed support terminating a concaved seat fitting said semi-cylindrical portion and upon which said blade is adapted to rock.

36. In a rotary engine, the combination with a casing member and a piston member, one of said members being rotatable, of a blade located in a recess in one of said members provided with a chamber intermediate its ends, and a fixed support entering said chamber and terminating in a seat for said blade and upon which it is adapted to rock.

37. In a rotary engine, the combination with a casing member and a piston member therein, one of said members being rotatable, of a pivoted blade mounted in a groove in one of said members with its working face normally depressed from the working face of said member and adapted to extend either edge beyond the said working face.

38. A rotary engine comprising a casing member provided with a chamber therein, a piston member within said chamber, means permitting the rotation of one of said members, and means included in said rotatable member for admitting motive force to said chamber and varying the cut-off thereof.

39. A rotary engine comprising a casing member provided with a chamber therein, a piston member within said chamber, means permitting the rotation of one of said members, and means included in said rotatable member for admitting motive force to said chamber and varying the cut-off thereof.

40. In a rotary engine, the combination with a casing member and a piston member therein, one of said members being rotatable, of a blade pivoted to one of said members, and a rocker member secured to said blade provided with a chamber in the face thereof adapted to receive motive force therein to partially balance the pressure upon the rear face of said rocker member.

41. A rotary engine comprising a casing member having a main chamber, a piston member therein, means permitting the rotation of one of said members, a blade in one of said members coöperating with the other member, and means for passing a temperature regulating agent through said blade.

42. A rotary engine comprising a casing member having a main chamber, a piston member therein, means permitting the rotation of one of said members, a second chamber in one of said members, and a blade in one of said members co-acting with the other member and provided with a conduit therethrough for the passage of motive force from one chamber to the other, said blade being separated from one of said chambers by a partition which forms its seat.

43. A rotary engine comprising a casing member having a main chamber, a piston member therein, means permitting the rotation of one of said members, pivoted blades in one of said members and co-acting with the other member, means to supply a temperature regulating medium to said blades, and connectors transmitting any movement of one of said blades to the other.

44. A rotary engine comprising a casing member having a main chamber, a piston member therein, means permitting the rotation of one of said members, blades in one of said members and co-acting with the other, and connectors transmitting any movement of one of said blades to the other, and means for supplying a temperature regulating agent to said blades.

45. A rotary engine comprising a casing, a piston mounted therein, means permitting rotation of one of said members, a plate pivoted to one of said members and coöperating with the other member, a chamber within said piston communicating with the interior of said casing, means for admitting motive force to said chamber and means operatively connected to said piston for reversing the engine.

46. A rotary engine comprising a casing, a piston mounted therein, means permitting rotation of one of said members, a plate pivoted to one of said members and cooperating with the other member, a chamber within said piston communicating with the interior of said casing and means operatively connected to said piston for varying the passage of motive force to the interior of the casing and for reversing the piston.

47. A rotary engine comprising a casing member having a main chamber, a piston member therein, means permitting the rotation of one of said members, blades in one of said members and co-acting with the other member, said blades being constructed to permit the exhaust therethrough, and connectors transmitting any movement of one of said blades to the other.

48. A rotary engine comprising a casing member having a main chamber, a piston member therein, means permitting the rotation of one of said members, pivoted blades in one of said members and co-acting with the other, means permitting the exhaust through said blades, means for supplying a temperature regulating agent to said blades, and connectors transmitting any movement of one of said blades to the other.

49. The combination of a cylinder, a rotor, an oscillatory abutment, a valve independent thereof, and concentric with the rotor shaft, and means to shift said valve and abutment to cause reversal of the engine.

50. The combination of a cylinder, a rotor, an oscillatory abutment, a valve independent thereof, means to shift said valve and abutment to cause reversal of the engine, and means to exhaust through said abutment.

51. The combination of a cylinder, a rotor, an oscillatory abutment, means to exhaust through and about said abutment, a valve independent of said abutment, and means for shifting said valve and abutment to cause reversal of the engine.

52. The combination of a cylinder, a rotor, an oscillatory abutment and means to admit actuating fluid to said cylinder through said rotor, and to exhaust said fluid through said abutment.

53. The combination of a cylinder, a rotor, an oscillatory abutment, means to admit actuating fluid to said cylinder through said rotor and to exhaust said fluid through and about said abutment.

54. The combination of a cylinder, a rotor, means to circulate a temperature regulating agent through said rotor, an oscillatory abutment, and means to admit actuating fluid to said cylinder through said rotor and to exhaust said fluid through the abutment.

55. The combination of a cylinder, a rotor, an oscillatory abutment, means to circulate a temperature regulating agent through said rotor and abutment, and means to admit actuating fluid to said cylinder through said rotor and to exhaust said fluid through said abutment.

56. The combination of a cylinder, a rotor, an oscillatory abutment having a rotor contacting portion movable relatively to said abutment, and means to admit actuating fluid to said cylinder through said rotor and to exhaust said fluid through said abutment.

57. The combination of a cylinder, a rotor, an oscillatory abutment having a rotor contacting portion pivoted thereto, and means to admit actuating fluid to said cylinder through said rotor and to exhaust said fluid through said abutment.

58. A reversible engine comprising a cylinder, a rotor, an oscillatory abutment and a plurality of oscillatory make and break contact members thereon adapted to be moved into and out of contact with said rotor by oscillation of said abutment.

59. The combination of a cylinder, a rotor, an oscillatory abutment having means to exhaust therethrough and a plurality of oscillatory make and break contact members upon said abutment and adapted to be moved into and out of contact with the rotor by oscillation of said abutment.

60. The combination of a cylinder, a rotor, an oscillatory abutment having an exhaust passage therethrough and two make and break contact members upon opposite sides of said exhaust passage and adapted to be moved into and out of contact with said rotor by oscillation of the abutment.

61. The combination of a cylinder, a rotor, an oscillatory abutment, means to exhaust through and about said abutment, and a pair of oscillatory make and break contact members upon said abutment and movable into and out of contact with the rotor by oscillation of the abutment.

62. A reversible rotary engine comprising in combination a cylinder, its rotor and an abutment, and a make and break point contact on said abutment and movable relative thereto.

63. In a rotary engine, the combination of a cylinder, its rotor, an abutment, means to circulate a temperature regulating agent through said abutment and a point contact on the abutment and movable relative thereto.

64. In a rotary engine, the combination with a cylinder, its rotor, an abutment and a point contact member pivoted upon the abutment and means to exhaust past said abutments.

65. In a rotary engine, the combination of a cylinder, its rotor, an abutment, a pivoted two point contact member upon the abutment, and a face independent of said contact to limit movement thereof relative to the abutment.

66. In a rotary engine, the combination with a cylinder, its rotor, an abutment, means to exhaust through said abutment and movable point contacts upon said abutment at opposite sides of the exhaust passage therethrough and a face independent of said contacts to limit movement thereof relative to the abutment.

67. In a rotary engine, the combination with a cylinder, its rotor, an abutment and a pivoted pressure-packed point contact member upon the abutment and movable relative thereto.

68. In a rotary engine, the combination with a cylinder, its rotor, and movable abutment, of a pressure-balanced contact member for said abutment.

69. In a rotary engine, the combination with a cylinder, its rotor, an abutment, an exhaust passage through said abutment and movable liquid-packed contact members upon said abutment on opposite sides of said exhaust passage.

70. In a rotary engine, the combination of a cylinder, its rotor, and an oscillatory abutment intermediately supported within its peripheral face.

71. In a rotary engine, the combination of a cylinder, its rotor, an oscillatory abutment intermediately supported within said peripheral face and provided with an exhaust passage.

72. In a rotary engine, the combination of a cylinder, its rotor, an oscillatory abutment, and means exterior to the cylinder and its ports utilizing engine fluid-pressure to move said abutment in a direction to retain it in operative relationship to said rotor.

73. In a rotary engine, the combination of a cylinder, its rotor, an oscillatory abutment, and means exterior to the cylinder and its ports and utilizing engine fluid-pressure to move said abutment in a plurality of directions, according to the direction of rotation of the piston, to tend to retain said abutment in operative relationship to said piston.

74. A rotary engine containing, in combination, a cylinder, its rotor and a valve concentric with said rotor having offset ports respectively to produce rotation of the rotor in opposite directions.

75. A rotary engine containing, in combination, a cylinder, a rotor, a shaft therefor and a valve concentric with said shaft and having offset ports adapted respectively to produce rotation of the rotor in opposite directions.

76. A rotary engine containing, in combination, a rotor and direct and reversing valves having offset ports.

77. A rotary engine containing, in combination, a cylinder, its rotor, and a valve located in said rotor having offset ports respectively to produce rotation of the rotor in opposite directions.

78. A rotary engine containing, in combination, a cylinder, its rotor, a movable abutment having a relatively movable contacting member thereon, and a valve located in said rotor and having offset ports adapted respectively to produce rotation of the rotor in opposite directions.

79. A rotary engine containing, in combination, a cylinder and rotor therefor having an internal admission port, and means to circulate a temperature regulating agent around said port while the rotor is in motion.

80. A rotary engine containing, in combination, a cylinder, and rotor therefor, having an internal admission port and means to circulate a temperature regulating agent adjacent said port while the rotor is in motion.

81. A rotary engine containing, in combination, a cylinder, its rotor, an oscillatory abutment having an exhaust port and movable contact members on each side of said exhaust port, said exhaust port being substantially tangential to the cylinder when in position to exhaust.

82. A rotary engine containing, in combination, a cylinder, its rotor, an oscillatory abutment containing an exhaust port, and means to balance the abutment by the action of the motive force.

83. A rotary engine containing, in combination, a cylinder, its rotor, an oscillatory abutment having an exhaust port, and means to supply a balancing liquid to the outer face of said abutment.

84. A rotary engine comprising a casing and a relatively rotatable rotor mounted therein, heads for said casing, an abutment mounted for coöperation with said rotor and said casing, and a wearing shoe having an integral two point contact portion.

85. A rotary engine comprising a casing and a rotor mounted for relative rotation therein, heads for said casing, an abutment mounted for coöperation with said rotor and said casing, a removable holder carried by said abutment and a wearing shoe carried by said holder, said shoe having an integral two point contact portion.

86. In a rotary engine, the combination of a cylinder, its rotor and an abutment having an in and out movement with respect to the rotor, means to circulate a temperature regulating agent through said abutment, and a point contact on the abutment and movable relative thereto.

87. A rotary engine containing in combination a cylinder, its rotor, and an abutment swingingly mounted in the cylinder and having offset from its face a pair of members movable with respect thereto, having two point contacts and adapted to bear upon the surface of said rotor.

88. A rotary reversing engine containing in combination a cylinder, its rotor and an abutment swingingly mounted in the cylinder and having offset from its face and differently facing a pair of shoes movable with respect to said abutment and adapted to bear upon the surface of said rotor in alternation in the direct running and in the reversal of the engine.

89. A rotary engine comprising a casing, a rotor mounted for rotation therein, two abutments movably connected with said rotor and each having two parts relatively movable with respect to said abutment and adapted to bear upon the face of the rotor, means tending constantly to draw said parts into engagement with said rotor, and means for reversing the engine.

90. In a rotary pump or engine, the combination with a cylinder, its rotor and an abutment, of a shoe carried by said abutment and chambered for the reception of a fluid, said shoe being provided with an opening leading to said chamber and permitting the introduction of fluid thereinto.

Signed by me at Boston, Massachusetts, this 20th day of April, 1906.

WILLIAM N. MEARS.

Witnesses:
EDNA C. CLEVELAND,
WALTER E. LOMBARD.

Copies of this patent may be obtained or five cents each, by addressing the "Commissioner of Patents, Washington, D. C."